US006018329A

United States Patent [19]

Kida et al.

[11] Patent Number: 6,018,329

[45] Date of Patent: Jan. 25, 2000

[54] DRIVING SYSTEM FOR A PLASMA DISPLAY PANEL

[75] Inventors: Hiroshi Kida; Hiroshi Ando, both of Yamanashi-ken, Japan

[73] Assignee: Pioneer Electronic Corporation, Tokyo, Japan

[21] Appl. No.: 09/018,656

[22] Filed: Feb. 4, 1998

[30] Foreign Application Priority Data

Feb. 4, 1997 [JP] Japan .................................... 9-035608

[51] Int. Cl.[7] .............................. G09G 3/28; H04N 7/01; H04N 1/40

[52] U.S. Cl. ............................ 345/60; 348/451; 358/458

[58] Field of Search ................................. 345/60, 87, 99, 345/115, 147; 348/451, 452, 431; 358/620, 458; 315/169.1, 169.4

[56] References Cited

U.S. PATENT DOCUMENTS

| | | | |
|---|---|---|---|
| 5,436,634 | 7/1995 | Kanazawa | 345/60 |
| 5,790,704 | 8/1998 | Rao et al. | 358/458 |
| 5,796,437 | 8/1998 | Muraji et al. | 348/452 |
| 5,818,419 | 10/1998 | Tajima et al. | 345/60 |
| 5,917,471 | 6/1999 | Choi | 345/147 |

*Primary Examiner*—Vijay Shankar
*Assistant Examiner*—Mortaza Zarakhsh
*Attorney, Agent, or Firm*—Nikaido Marmelstein Murray & Oram LLP

[57] ABSTRACT

A discriminator is provided in a driving system for a plasma display panel so as to discriminate whether an input video signal is a moving picture signal or a still picture signal, and an A/D converter is provided for sampling the video signal for producing a pixel data having n-bit. The pixel data is converted into a false contour correcting pixel data having a (n+m)-bit based on a correcting pixel data derived from a table. A controller selects the false contour correcting pixel data when the input video signal is a moving picture signal, and selects the pixel data from the A/D converter when a still picture signal. The plasma display panel is driven by a pixel data determined by the controller.

10 Claims, 7 Drawing Sheets

FIG.4

| LUMINANCE LEVEL | PIXEL DATA | FIRST CONVERTING TABLE | SECOND CONVERTING TABLE |
|---|---|---|---|
| | Z<br>5– –– –0 | AZ<br>7– –– –– –0 | BZ<br>7– –– –– –0 |
| 00 | 00 00 00 | 00 00 00 00 | 00 00 00 00 |
| 01 | 00 00 01 | 00 00 01 00 | 00 00 01 00 |
| 02 | 00 00 10 | 00 00 10 00 | 00 00 10 00 |
| 03 | 00 00 11 | 00 00 11 00 | 00 00 11 00 |
| 04 | 00 01 00 | 00 01 00 00 | 00 01 00 00 |
| 05 | 00 01 01 | 00 01 01 00 | 00 01 01 00 |
| 06 | 00 01 10 | 00 01 10 00 | 00 01 10 00 |
| 07 | 00 01 11 | 00 01 11 00 | 00 01 11 00 |
| 08 | 00 10 00 | 00 10 00 00 | 00 10 00 00 |
| 09 | 00 10 01 | 00 10 01 00 | 00 10 01 00 |
| 10 | 00 10 10 | 00 10 10 00 | 00 10 10 00 |
| 11 | 00 10 11 | 00 10 11 00 | 00 10 11 00 |
| 12 | 00 11 00 | 00 11 00 00 | 00 11 00 00 |
| 13 | 00 11 01 | 00 11 01 00 | 00 11 01 00 |
| 14 | 00 11 10 | 00 11 10 00 | 00 11 10 00 |
| 15 | 00 11 11 | 00 11 11 00 | 00 11 11 00 |
| 16 | 00 00 00 | 10 01 00 00 | 00 01 00 01 |
| 17 | 00 00 01 | 10 01 01 00 | 00 01 01 01 |
| 18 | 00 00 10 | 10 11 00 00 | 00 11 00 01 |
| 19 | 00 00 11 | 10 11 01 00 | 00 11 01 01 |
| 20 | 00 01 00 | 10 01 10 00 | 00 01 10 01 |
| 21 | 00 01 01 | 10 01 11 00 | 00 01 11 01 |
| 22 | 00 01 10 | 10 11 10 00 | 00 11 10 01 |
| 23 | 00 01 11 | 10 11 11 00 | 00 11 11 01 |
| 24 | 00 10 00 | 10 01 00 01 | 10 01 00 01 |
| 25 | 00 10 01 | 10 01 01 01 | 10 01 01 01 |
| 26 | 00 10 10 | 10 11 00 01 | 10 11 00 01 |
| 27 | 00 10 11 | 10 11 01 01 | 10 11 01 01 |
| 28 | 00 11 00 | 10 01 10 01 | 10 01 10 01 |
| 39 | 00 11 01 | 10 01 11 01 | 10 01 11 01 |
| 30 | 00 11 10 | 10 11 10 01 | 10 11 10 01 |
| 31 | 00 11 11 | 10 11 11 01 | 10 11 11 01 |

FIG.5

| LUMINANCE LEVEL | PIXEL DATA | FIRST CONVERTING TABLE | SECOND CONVERTING TABLE |
|---|---|---|---|
| | Z<br>5— —— —0 | AZ<br>7— —— —— —0 | BZ<br>7— —— —— —0 |
| 32 | 10 00 00 | 01 01 00 01 | 10 01 00 10 |
| 33 | 10 00 01 | 01 01 01 01 | 10 01 01 10 |
| 34 | 10 00 10 | 01 11 00 01 | 10 11 00 10 |
| 35 | 10 00 11 | 01 11 01 01 | 10 11 01 10 |
| 36 | 10 01 00 | 01 01 10 01 | 10 01 10 10 |
| 37 | 10 01 01 | 01 01 11 01 | 10 01 11 10 |
| 38 | 10 01 10 | 01 11 10 01 | 10 11 10 10 |
| 39 | 10 01 11 | 01 11 11 01 | 10 11 11 10 |
| 40 | 10 10 00 | 01 01 00 10 | 01 01 00 10 |
| 41 | 10 10 01 | 01 01 01 10 | 01 01 01 10 |
| 42 | 10 10 10 | 01 11 00 10 | 01 11 00 10 |
| 43 | 10 10 11 | 01 11 01 10 | 01 11 01 10 |
| 44 | 10 11 00 | 01 01 10 10 | 01 01 10 10 |
| 45 | 10 11 01 | 01 01 11 10 | 01 01 11 10 |
| 46 | 10 11 10 | 01 11 10 10 | 01 11 10 10 |
| 47 | 10 11 11 | 01 11 11 10 | 01 11 11 10 |
| 48 | 11 00 00 | 11 01 00 10 | 01 01 00 11 |
| 49 | 11 00 01 | 11 01 01 10 | 01 01 01 11 |
| 50 | 11 00 10 | 11 11 00 10 | 01 11 00 11 |
| 51 | 11 00 11 | 11 11 01 10 | 01 11 01 11 |
| 52 | 11 01 00 | 11 01 10 10 | 01 01 10 11 |
| 53 | 11 01 01 | 11 01 11 10 | 01 01 11 11 |
| 54 | 11 01 10 | 11 11 10 10 | 01 11 10 11 |
| 55 | 11 01 11 | 11 11 11 10 | 01 11 11 11 |
| 56 | 11 10 00 | 11 01 00 11 | 11 01 00 11 |
| 57 | 11 10 01 | 11 01 01 11 | 11 01 01 11 |
| 58 | 11 10 10 | 11 11 00 11 | 11 11 00 11 |
| 59 | 11 10 11 | 11 11 01 11 | 11 11 01 11 |
| 60 | 11 11 00 | 11 01 10 11 | 11 01 10 11 |
| 61 | 11 11 01 | 11 01 11 11 | 11 01 11 11 |
| 62 | 11 11 10 | 11 11 10 11 | 11 11 10 11 |
| 63 | 11 11 11 | 11 11 11 11 | 11 11 11 11 |

FIRST FIELD

SECOND FIELD

DRIVING SYSTEM FOR A PLASMA DISPLAY PANEL

BACKGROUND OF THE INVENTION

The present invention relates to a driving system for driving a plasma display panel (PDP) of a matrix display type.

Recently, as a display device becomes large in size, thickness of the display device is desired to be thin. Therefore, various types of display devices of thin thickness are provided. As one of the display devices, an ACPDP is known.

A conventional ACPDP comprises a plurality of data electrodes, and a plurality of row electrodes formed in pairs and disposed to intersect the data electrodes. A pair of row electrodes form one row (one scanning line) of an image. The data electrodes and the row electrodes are covered by dielectric layers respectively, at a discharge space. At the intersection of each of the data electrodes and each pair of row electrodes, a discharge cell (pixel) is formed.

As a method for displaying an image on the PDP, each frame (field) of a video signal is divided into N pieces of sub-frames (sub-fields), and each sub-frame (sub-field) emits the light for a time length corresponding to a weight applied to each bit of n-bit pixel data (sub-frame method).

In the method, if a pixel data for each pixel has 6 bits, each frame is divided into six sub-frames, SF1, SF2, . . . SF6. The sub-frames SF1 to SF6 emit the light by sustaining discharge at 1 time, 2 times, 4 times, 8 times, 16 times and 32 times, respectively, in order. Thus, the tone of 64 steps can be obtained by combining the six sub-frames.

However, in such a method, when an image is moved in plane on the PDP, false contours of stripes are recognized as if the tone of the image is lost near the area where the image crosses the border at the tone level of the n power of 2 such as 32nd or 16th. Therefore, a problem that the quality of display is extremely deteriorated arises. In order to reduce the false contours, thereby restraining reduction of the quality of display, the method wherein a sub-frame having a large weight is divided into a plurality of parts, and these parts are separately disposed in a frame has been proposed.

There are two cases in the PDP that, a video signal (interlace video signal) produced by the interlace scanning as used in the NTSC system is displayed, and that a video signal (non-interlace video signal) produced by the non-interlace scanning as used in the personal computer is displayed.

In the display using the interlace video signal, light emitting luminance is low. Therefore, the interlace video signal is processed by the scanning line interpolation to be converted into the non-interlace video signal, thereby obtaining the same amount of data as the non-interlace video signal. However, if the false contour process is carried out on the converted non-interlace video signal, the number of sub-frames in one frame (field) period increases. On the other hand, since the computer picture image is mainly still picture, it is not necessary to process the false contour. However, in the display of the NTSC system, the interlace video signal is used for mostly displaying a moving picture. In order to improve the quality of the display of the interlace video signal, it is necessary to process false contour correction.

Furthermore, in order to improve the picture quality of the display of NTSC system using the interlace video signal, if the number of bits of a pixel data is increased, the number of sub-frames in one frame (field) is further increased. As a result, it is necessary to increase a capacity of a memory for the false contour correcting process and the improvement in the picture quality. Therefore, a problem that manufacturing cost is increased arises.

SUMMARY OF THE INVENTION

An object of the present invention is to provide a driving system for a plasma display panel which may improve the quality of display at a low manufacturing cost.

According to the present invention, there is provided a driving system for a plasma display panel having a plurality of row electrodes and a plurality of data electrodes which intersect with the row electrodes, comprising a table storing a plurality of correcting pixel data, each of the correcting pixel data being divided into a plurality of sub-frames, discriminating means for discriminating whether an input video signal is a moving picture signal or a still picture signal, and for producing a first discrimination signal, an A/D converter for sampling the video signal for producing a pixel data having n-bit, pixel data processing means for converting the pixel data into a false contour correcting pixel data having a (n+m)-bit based on a correcting pixel data derived from the table, changeover selecting means for selecting either of the false contour correcting pixel data or the pixel data from the A/D converter, control means responsive to the first discrimination signal for controlling the changeover selecting means so as to select the false contour correcting pixel data when the input video signal is a moving picture signal, and to select the pixel data from the A/D converter when a still picture signal, a memory for storing a data divided into a plurality of sub-frames and selected by the changeover selecting means, and driving means for driving the plasma display panel by a pixel data derived from the memory.

The control means is provided for controlling the driving means so as to drive neighboring two rows as one unit of scanning by line sequential scanning when the first discrimination signal represents the moving picture signal, and for shifting the rows scanned at the same time by one row electrode in a first field and a second field.

The discriminating means is provided for further discriminating whether the input video signal is produced by interlace scanning or non-interlace scanning, and for producing a second discrimination signal.

The table comprises a first table and a second table, one of the first and second tables stores correcting pixel data different from correcting pixel data stored in the other table in weight in accordance with luminance levels.

Furthermore, the control means is provided for compressing the input video signal in a vertical direction when the first discrimination signal represents the moving picture signal and the second discrimination signal represents that the input video signal is produced by the non-interlace scanning.

The plasma display panel is driven by line sequential scanning when the first discrimination signal represents the still picture signal and the second discrimination signal represents that the input video signal is produced by the non-interlace scanning.

The plasma display panel is driven so that neighboring two rows are driven as one unit of scanning by line sequential scanning, and the rows scanned at the same time are shifted by one row electrode in a first field and a second field when the first discrimination signal represents the still picture signal and the second discrimination signal represents that the input video signal is produced by the interlace scanning.

The driving system further comprises means for processing scanning line interpolation, the control means is provided for controlling the changeover selecting means so as to store the pixel data generated from the means for processing scanning line interpolation and for controlling the driving means so as to drive the plasma display panel by line sequential scanning when the first discrimination signal represents the still picture signal and the second discrimination signal represents that the input video signal is produced by the interlace scanning.

These and other objects and features of the present invention will become more apparent from the following detailed description with reference to the accompanying drawings.

BRIEF DESCRIPTION OF DRAWINGS

FIGS. 4 and 5 show first and second converting tables of correcting data for the pixel;

DETAILED DESCRIPTION OF THE PREFERRED EMBODIMENT

Figure 1:
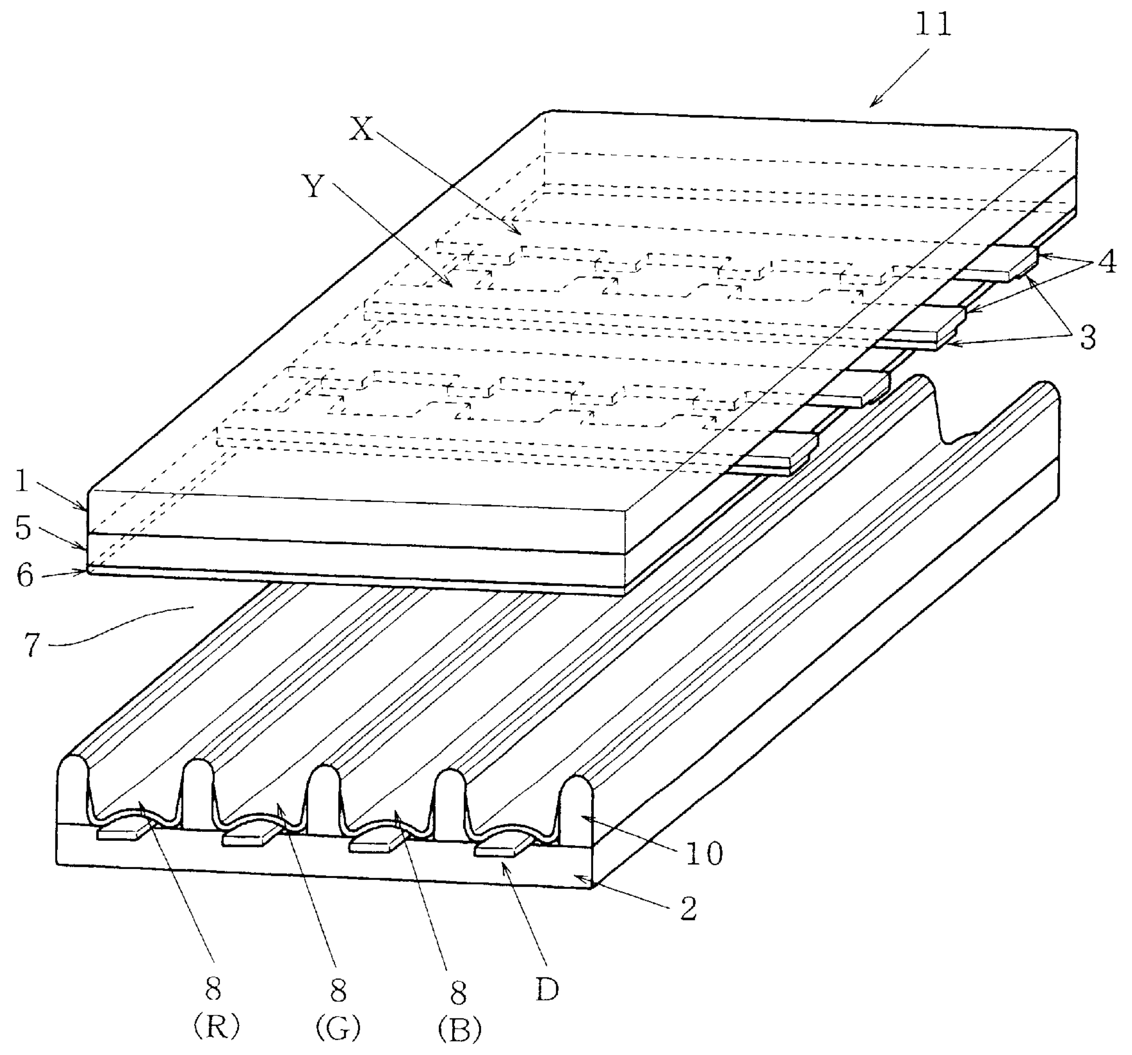
FIG. 1 is a schematic perspective view a plasma display panel according to the present invention.

FIG. 1 shows an ACPDP of a reflection type of three-electrode according to the present invention. An ACPDP 11 comprises a pair of glass substrates 1 and 2 disposed opposite to each other, interposing a discharge space 7 therebetween. The glass substrate 1 as a display portion has row electrodes (sustain electrodes) X and Y which are alternately disposed in pairs to be parallel with each other at the inside portion thereof. The row electrodes X and Y are covered by a dielectric layer 5 for producing wall charge. A protection layer 6 made of MgO is coated on the dielectric layer 5.

Each of the row electrodes X and Y comprises a transparent electrode 4 formed by a transparent conductive film having a large width and bus electrode (metallic electrode) 3 formed by a metallic film having a small width and layered on the transparent electrode 4.

On the glass substrate 2 as a rear member, a plurality of elongated barriers 10 are provided at the inside portion thereof for defining the discharge space 7. The barrier 10 extends in the direction perpendicular to the row electrodes X, Y. Between the barriers 10, data electrodes (address electrodes) D are formed to intersect the row electrodes X and Y of the glass substrate 1. A phosphor layer 8 having a predetermined luminous color R, G or B covers each of the data electrodes D and opposite side portions of the barrier 10. The discharge space 7 is filled with discharge gas consisting of neon mixed with xenon. Thus, a discharge cell (pixel) is formed at the intersection of the row electrodes in pairs and the data electrodes.

Figure 2:
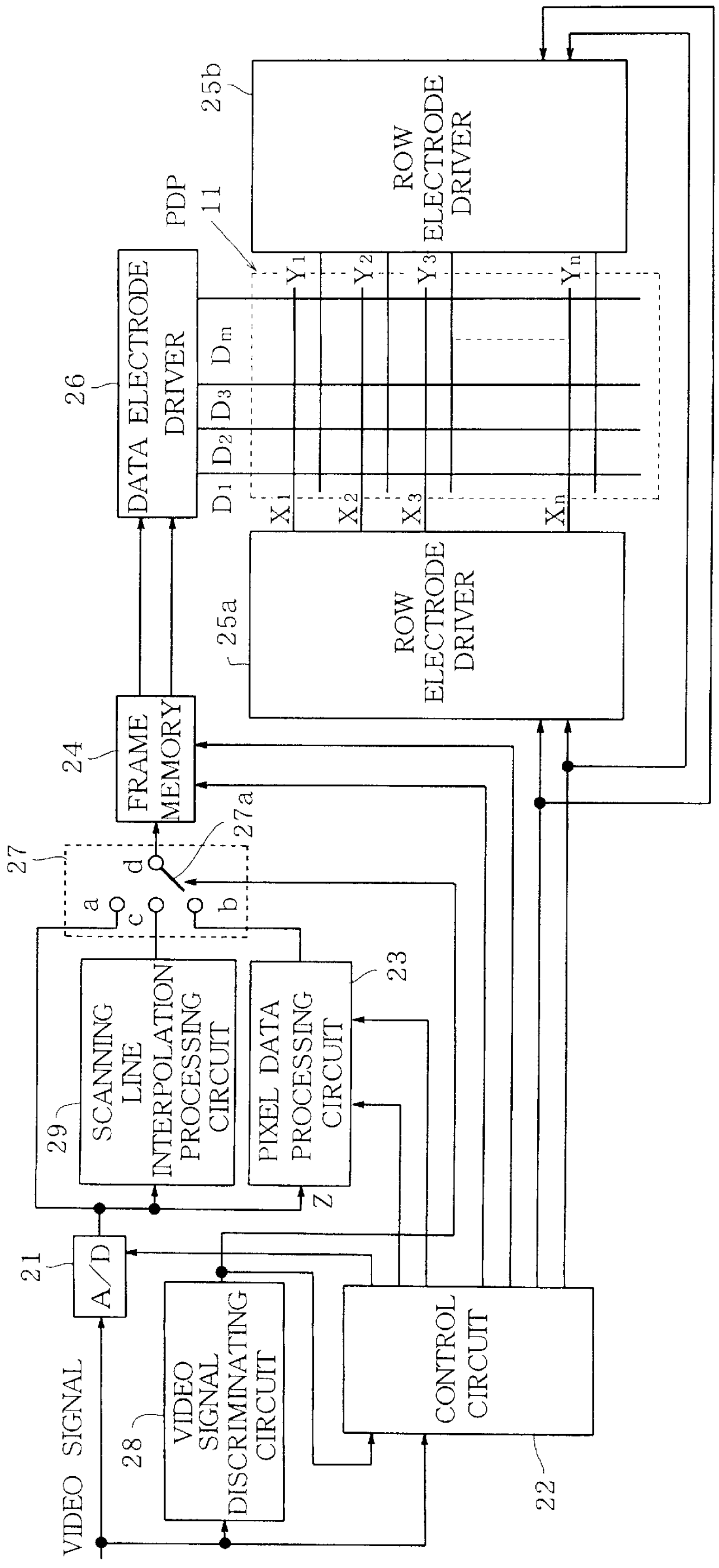
FIG. 2 is a block diagram showing a driving system for the plasma display panel.

Referring to FIG. 2 showing a driving system for driving the PDP 11, the driving system comprises a video signal discriminating circuit 28 applied with a video signal for determining whether the input video signal is for a moving picture or a still picture and producing a first discriminating signal. The video signal is further determined whether it is produced by interlace scanning or non-interlace scanning. The video signal produced by the interlace scanning (as aforementioned, the interlace video signal used in the display of the NTSC system) is formed by N scanning lines of one frame (for example, 262.5 lines) at a first horizontal scanning frequency (for example, 15.75 kHz). The video signal produced by the non-interlace scanning (as aforementioned, the non-interlace video signal used in the display of the personal computer) is formed by M scanning lines of one frame (M>N, for example, 525 lines) at a second horizontal scanning frequency (for example, 31.5 kHz). The video signal discriminating circuit 28 produces a second discriminating signal. These first and second discriminating signals are applied to a control circuit 22.

Responsive to the first and second discriminating signals, the control circuit 22 produces a control signal which is applied to a frame memory 24.

The control circuit 22 is further applied with the video signal for extracting horizontal and vertical synchronizing signals. The control circuit 22 produces various timing signals for generating reset, scanning, sustaining and erasing signals corresponding to the horizontal and vertical synchronizing signals. The timing signals are applied to row electrode drivers 25*a* and 25*b*.

The control circuit 22 further produces clock signals such as a sampling clock signal and selection signals. The sampling clock signal is applied to an A/D converter 21.

The A/D converter 21 is further applied with the video signal such as interlace or non-interlace video signal and operated for sampling the input video signal to obtain a pixel data of n-bit (for example, 6 bits) for each pixel corresponding to the sampling clock signal from the control circuit 22. The pixel data is applied to a pixel data processing circuit 23, a scanning line interpolation processing circuit 29 and a signal changeover selecting circuit 27.

The pixel data processing circuit 23 comprises a pixel data converting circuit. The pixel data converting circuit is applied with the clock signal, horizontal and vertical synchronizing signals and selection signal from the control circuit 22 for producing a false contour correcting pixel data. When the pixel data applied to the pixel data processing circuit 23 is for the moving picture, the circuit is operated to correct a false contour of the pixel data for the moving picture and produces a correcting pixel data of (n+m) bit (for example, 8 bits) for compensating the false contour. The false contour correcting pixel data is applied to the signal changeover selecting circuit 27.

The scanning line interpolation processing circuit 29 is operated to interpolate the scanning line of the input pixel data, thereby converting the interlace signal into the non-interlace pixel data. The converted signal is applied to the signal changeover selecting circuit 27.

The signal changeover selecting circuit 27 is a relay section and has three input terminals a, b and c, and one output terminal d having a movable contact 27*a*. The input terminal a is connected to the A/D converter 21, the input terminal b is connected to the pixel data processing circuit 23, and the input terminal c is connected to the scanning line interpolation processing circuit 29. The output terminal d is connected to the frame memory 24. The movable contact 27*a* is operated by the selection signal from the control circuit 22 for selectively connecting one of the input terminals a-c to the output terminal d.

When the video signal is the moving picture signal, the movable contact 27*a* is operated to connect to the input terminal b. Thus, the false contour correcting pixel data of the pixel data processing circuit 23 is applied to the frame memory 24.

When the video signal is the still picture signal, the movable contact 27*a* is operated to selectively connect to either one of the input terminals a and c. Thus, the pixel data from the A/D converter 21 or the scanning line interpolated pixel data from the scanning line interpolation processing circuit 29 is applied to the frame memory 24.

The frame memory 24 is further applied with the control signal from the control circuit 22 for controlling writing address and reading address thereof, thereby changing allotments thereof.

The frame memory 24 is operated to store the pixel data in order in dependency on the write-in control signal from the control circuit 22, and to read the pixel data stored therein in dependency on the read-out control signal from the control circuit 22. The read-out pixel data is applied to a pixel data electrode driver 26.

The frame memory 24 reads the pixel data of the bit corresponding to each sub-frame in order in accordance with the display order of the sub-frame.

The frame memory 24 has at least a capacity for storing the pixel data for one frame of the non-interlace video signal.

In the PDP 11, a pair of row electrodes X and Y are provided to form one row (one scanning line). The row electrodes X1–Xn are connected to the row electrode driver 25*a*. The row electrodes Y1–Yn are connected to the row electrode driver 25*b*.

The row electrode driver 25*a* produces a reset pulse for initializing wall charges of all of the discharge cells all at once, a scanning pulse (selective writing pulse or selective erasing pulse) for selectively forming or erasing the wall charge in dependency on the pixel data, thereby selecting a lighted pixel (cell) or unlighted pixel (cell), a sustaining pulse for sustaining the lighted pixel or unlighted pixel (namely, sustaining the discharge and emission of light), and an erasing pulse for erasing the wall charge of the discharge cell, corresponding to the timing signals from the control circuit 22. These pulses are applied to the row electrodes X1–Xn. The scanning pulse is sequentially applied from the row electrode X1 to the row electrode Xn in order.

The row electrode driver 25*b* produces a reset pulse for initializing wall charges of all of the discharge cells all at once, and a sustaining pulse for sustaining the lighted pixel or unlighted pixel (sustaining the discharge and emission of light), corresponding to the timing signals from the control circuit 22. These reset and sustaining pulses are applied to the row electrodes Y1–Yn at the respective timings.

The pixel data electrode driver 26 is connected to pixel data electrodes D1–Dm. The pixel data electrode driver 26 produces a pixel data pulse having voltage corresponding to the logic value "1" or "0" of each bit of the pixel data corresponding to the sub-frame which is applied from the frame memory 24. The pixel data pulse is applied to the pixel data electrodes D1–Dm.

Figure 3:
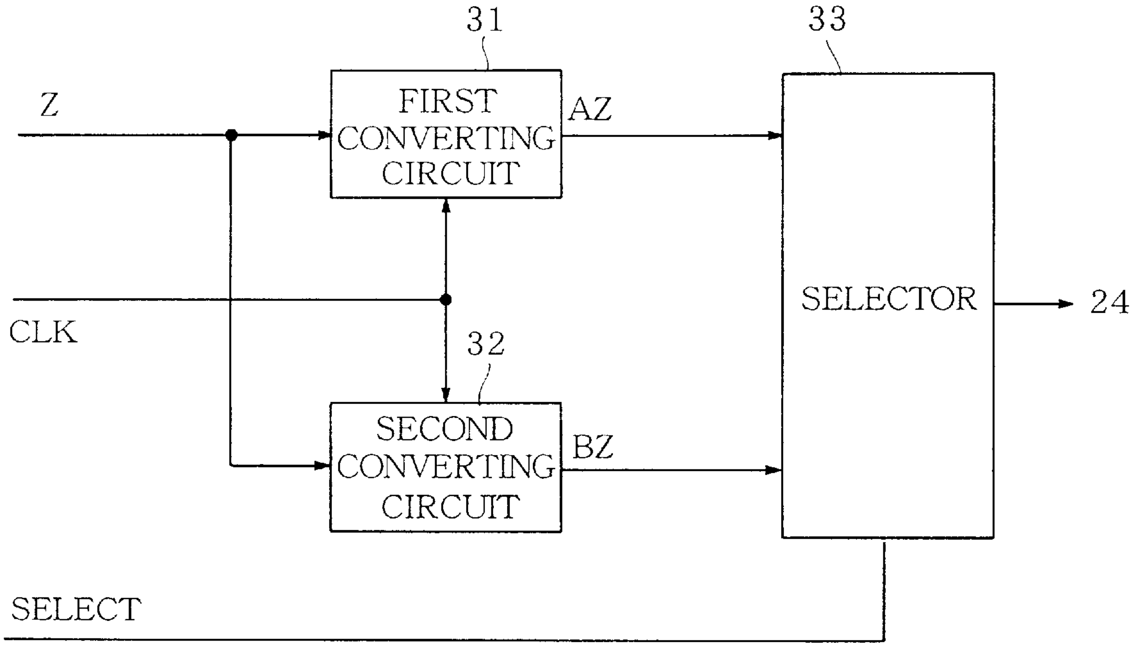
FIG. 3 is a block diagram showing a pixel data converting circuit provided in the driving system.

FIG. 3 shows the pixel data converting circuit of the pixel data processing circuit 23. The pixel data converting circuit comprises first and second converting circuits 31 and 32, and a selector 33.

The first data converting circuit 31 converts the pixel data Z of 6 bits applied from the A/D converter 21 to a correcting pixel data AZ of 8 bits of the corresponding luminance level in accordance with a first converting table as shown in FIGS. 4 and 5. The correcting pixel data AZ is applied to the selector 33.

Similarly, the second data converting circuit 32 converts the pixel data Z of 6 bits to a correcting pixel data BZ of 8 bits of the corresponding luminance level in accordance with a second converting table of FIGS. 4 and 5. The correcting pixel data BZ is applied to the selector 33.

The logic value "1" of each bit of the correcting pixel data AZ (BZ) shown in FIGS. 4 and 5 indicates the emission of light, and the logic value "0" indicates the non-emission of light. The light emitting period and figure position of each sub-frame in the eight figures are formed in accordance with the format of the light emitting period and the order shown in FIG. 6.

Figure 6:
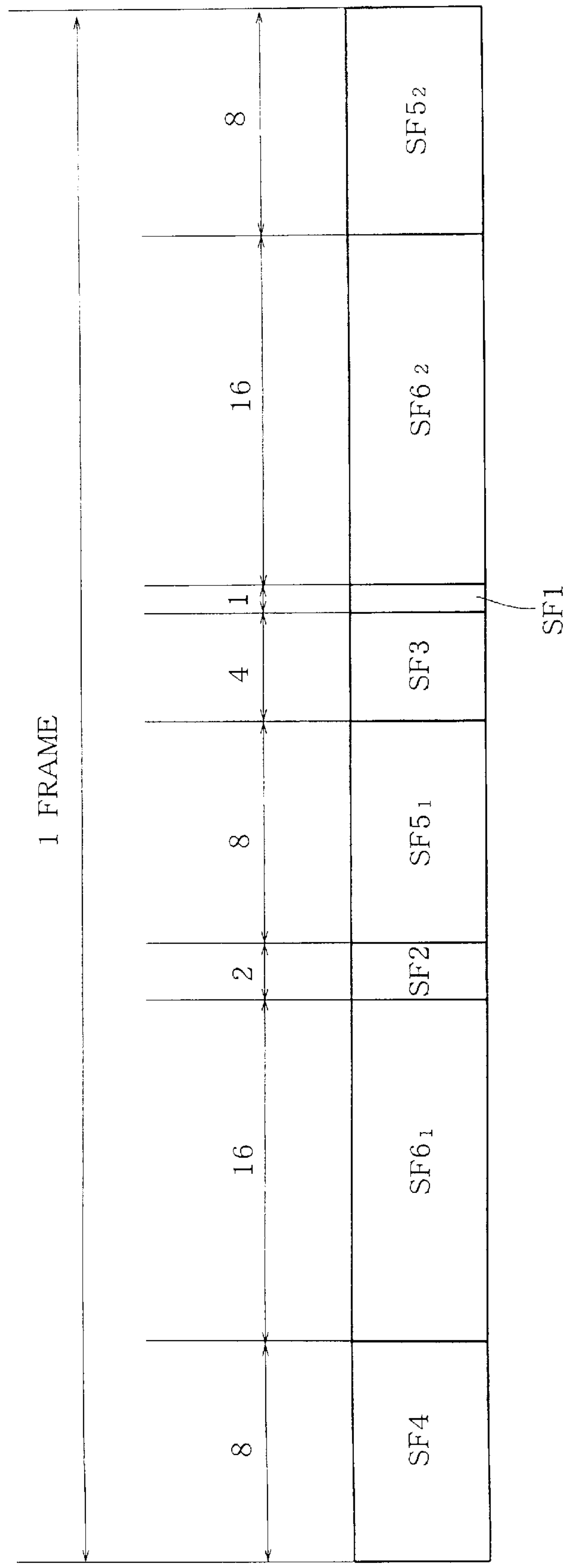
FIG. 6 is a diagram showing a light emitting format of sub-frames corresponding to the respective bits in one frame.

Namely, the 7th bit of the correcting pixel data AZ (BZ) corresponds to the sub-frame SF4 (light emitting period "8") of FIG. 6, the 6th bit corresponds to the sub-frame SF$\mathbf{6}_1$ (light emitting period "16"), the 5th bit corresponds to the sub-frame SF2 (light emitting period "2"), the 4th bit corresponds to the sub-frame SF$\mathbf{5}_1$ (light emitting period "8"), the 3rd bit corresponds to the sub-frame SF3 (light emitting period "4"), the 2nd bit corresponds to the sub-frame SF1 (light emitting period "1"), the 1st bit corresponds to the sub-frame SF$\mathbf{6}_2$ (light emitting period "16"), and the zeroth bit corresponds to the sub-frame SF$\mathbf{5}_2$ (light emitting period "8"), respectively. The total of the light emitting periods (light emitting times) correspond the luminance level.

The sub-frames SF6 and SF5 having the large weight are divided into SF$\mathbf{6}_1$ and SF$\mathbf{6}_2$ and SF$\mathbf{5}_1$ and SF$\mathbf{5}_2$,respectively, and separately disposed in the frame.

The selector 33 selects one of the correcting pixel data AZ and BZ for each pixel corresponding to the selection signal from the control circuit 22 and produces the correcting pixel data which is applied to the frame memory 24.

In the embodiment, two converting patterns (light emitting patterns) are provided by the first and second converting tables. Each of the light emitting patterns has the same luminance level and the the same light emitting period of the sub-frames in one frame.

However, the light emitting positions of the sub-frames are different from each other. Thus, the light emitting pattern is changed for each pixel, thereby reducing the false contour.

When the video signal for the moving picture is discriminated, the movable contact 27*a* of the signal changeover selecting circuit 27 is connected to the input terminal b in accordance with the selection signal from the control circuit 22. Thus, the false contour correcting pixel data of the pixel data processing circuit 23 is applied to the frame memory 24.

If the video signal for the moving picture is the interlace video signal, the pixel data is stored in the frame memory 24 as it is.

However, if the video signal for the moving picture is the non-interlace video signal, when the pixel data is stored in the frame memory, the writing address is controlled so as to compress the pixel data in the vertical direction (thinning out).

The frame memory 24 reads out the pixel data stored therein from the first line to the sequential line in order at each display period of the sub-frame. The read pixel data is applied to the data electrode driver 26 as the pixel data driving data.

In order to display the video signal for the moving picture on the PDP, sequential two row electrodes (X1, Y1 and X2, Y2) are driven as one scanning unit by the line sequential scanning, while one scanning unit of the row electrodes which are driven at the same time is shifted by one row electrode in a first field (odd number field) and a second field (even number field) respectively as shown in FIGS. 7*a* to 7*f*.

Figure 7A:
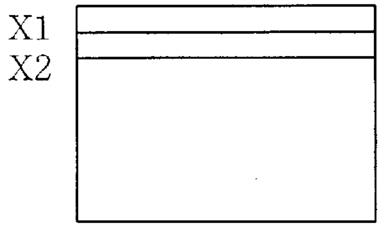
FIGS. 7*a* to 7*f* are diagrams showing first and second fields for explaining the moving of row electrodes.
Figure 7D:
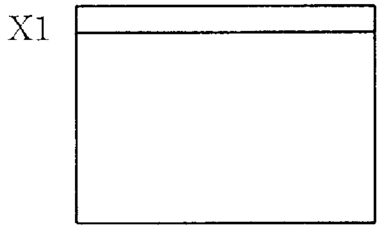
Figure 7B:
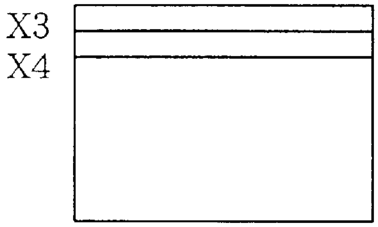
Figure 7E:
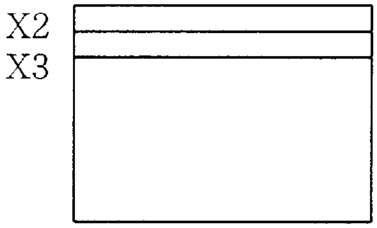
Figure 7C:
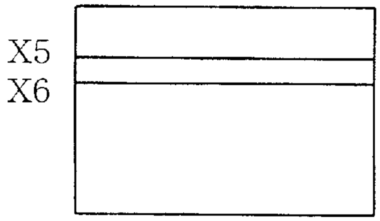
Figure 7F:
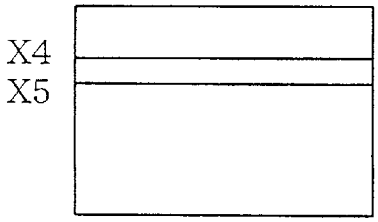

FIGS. 7*a* to 7*c* show row electrodes in the first field selected for scanning to write the data every horizontal scanning period. FIGS. 7*d* to 7*f* show row electrodes in the second field selected for scanning to write the data every horizontal scanning period. In the horizontal scanning period, the same data is written on the two rows (neighboring two row electrodes).

From the foregoing, in the interlace video signal for the moving picture, the pixel data are written on the two row electrodes at the same time. Thus, the amount of pixel data is reduced half compared with the non-interlace video signal, and the address period is also reduced half. Therefore, even if the number of sub-frames is increased for reducing the false contour, it is not necessary to increase the capacity of the frame memory 24.

In the non-interlace video signal for the moving picture, the number of scanning lines is compressed, and the two row electrodes are written at the same time. Thus, the amount of pixel data is reduced half compared with the non-interlace video signal for the still picture, and the address period is also reduced half. Therefore, the capacity of the frame memory 24 is prevented from increasing.

On the other hand, when the non-interlace video signal for the still picture is discriminated, the movable contact 27*a* is connected to the input terminal a in accordance with the selection signal from the control circuit. Thus, the pixel data of the A/D converter 21 is applied to the frame memory 24 and stored therein as it is. The data read from the frame memory 24 is applied to the pixel data driver 26. In display operation on the PDP, the PDP is driven by line sequential scanning.

When the interlace video signal for the still picture is discriminated, the movable contact 27*a* is manually connected to the input terminal a or c. Thus, the pixel data of the A/D converter 21 or the scanning line interpolation processing circuit 29 is applied to the frame memory 24 and stored therein as it is. In display operation, in accordance with the pixel data from the A/D converter 21, the two row electrodes are written at the same time as aforementioned. By the pixel data from the scanning line interpolation processing circuit 29, the PDP is driven by line sequential scanning.

If the number of sub-frames (bit number) is increased, the number of tones can be increased from 64 tones (6 bits) to 256 tones (8 bits). Furthermore, by using a surplus capacity of the memory, the pixel data can be temporarily stored therein.

In the embodiment, the video signal for the moving picture or the still picture is discriminated. The video signal only for the moving picture is processed to the false contour correction. Alternatively, the user may manually operate to select whether the false contour correction is processed to the input video signal (and two row electrodes are driven at the same time) or not.

In the embodiment, although the driving system is applied to the ACPDP of the reflection type of three electrode, the driving system of the present invention can be applied to other types of PDP such as a DCPDP.

In accordance with the present invention, the false contour correction is processed only to the video signal for the moving picture. Thus, the capacity of the memory is prevented from increasing, and the quality of display is increased.

In display operation, sequential two row electrodes are driven as one scanning unit by line sequential scanning, while the row electrodes of one scanning unit which are driven in the first and second fields at the same time are scanned to be shifted by one row electrode. Thus, the scanning period for writing is shortened, thereby obtaining time for increasing the sub-frames for the false contour correcting process.

In the non-interlace video signal for the moving picture, the number of scanning lines is compressed. Thus, the amount of data is reduced. Even if the number of sub-frames is increased, the capacity of the memory is prevented from increasing.

In the non-interlace video signal for the still picture, the PDP is driven by line sequential scanning. Thus, the quality of display is prevented.

In the video signal for the still picture, two row electrodes are scanned at the same time, or the scanning line is interpolated. Thereafter, the PDP is driven by line sequential scanning. Thus, the quality of display is prevented from reducing.

While the invention has been described in conjunction with preferred specific embodiment thereof, it will be understood that this description is intended to illustrate and not limit the scope of the invention, which is defined by the following claims.

What is claimed is:

1. A driving system for a plasma display panel having a plurality of row electrodes and a plurality of data electrodes which intersect with the row electrodes, comprising:

a table storing a plurality of correcting pixel data, each of the correcting pixel data being divided into a plurality of sub-frames;

discriminating means for discriminating whether an input video signal is a moving picture signal or a still picture signal, and for producing a first discrimination signal;

an A/D converter for sampling the video signal for producing a pixel data having n-bit;

pixel data processing means for converting the pixel data into a false contour correcting pixel data having a (n+m)-bit based on a correcting pixel data derived from the table;

changeover selecting means for selecting either of the false contour correcting pixel data or the pixel data from the A/D converter;

control means responsive to the first discrimination signal for controlling the changeover selecting means so as to select the false contour correcting pixel data when the input video signal is a moving picture signal, and to select the pixel data from the A/D converter when a still picture signal;

a memory for storing a data divided into a plurality of sub-frames and selected by the changeover electing means; and driving means for driving the plasma display panel by a pixel data derived from the memory.

2. The system according to claim 1 wherein the control means is provided for controlling the driving means so as to drive neighboring two rows as one unit of scanning by line sequential scanning when the first discrimination signal represents the moving picture signal, and for shifting the rows scanned at the same time by one row electrode in a first field and a second field.

3. The system according to claim 1 wherein the discriminating means is provided for further discriminating whether the input video signal is produced by interlace scanning or non-interlace scanning, and for producing a second discrimination signal.

4. The system according to claim 1 wherein the table comprises a first table and a second table, one of the first and second tables stores correcting pixel data different from correcting pixel data stored in the other table in weight in accordance with luminance levels.

5. The system according to claim 3 wherein the control means is provided for compressing the input video signal in a vertical direction when the first discrimination signal represents the moving picture signal and the second discrimination signal represents that the input video signal is produced by the non-interlace scanning.

6. The system according to claim 3 wherein the control means is provided for controlling the driving means so as to drive the plasma display panel by line sequential scanning when the first discrimination signal represents the still picture signal and the second discrimination signal represents that the input video signal is produced by the non-interlace scanning.

7. The system according to claim 3 wherein the control means is provided for controlling the driving means so as to drive neighboring two rows as one unit of scanning by line sequential scanning, and for shifting the rows scanned at the same time by one row electrode in a first field and a second field when the first discrimination signal represents the still picture signal and the second discrimination signal represents that the input video signal is produced by the interlace scanning.

8. The system according to claim 3 further comprising means for processing scanning line interpolation, the control means being provided for controlling the changeover selecting means so as to store the pixel data generated from the means for processing scanning line interpolation and for controlling the driving means so as to drive the plasma display panel by line sequential scanning when the first discrimination signal represents the still picture signal and the second discrimination signal represents that the input video signal is produced by the interlace scanning.

9. The system according to claim 4 wherein the pixel data processing means comprises first converting means for converting the pixel data into a false contour correcting pixel data based on a correcting pixel data derived from the first table, and a second converting means for converting the pixel data into a false contour correcting pixel data based on a correcting pixel data derived from the second table.

10. The system according to claim 4 wherein a first sub-frame in the first table having a light emitting period same as a second sub-frame in the second table is located at a position different from a position of the second sub-frame.

* * * * *